United States Patent
Kimura

(10) Patent No.: US 10,644,365 B2
(45) Date of Patent: May 5, 2020

(54) BATTERY PACK AND HEATER ASSEMBLY

(71) Applicant: TOYOTA JIDOSHA KABUSHIKI KAISHA, Toyota-shi, Aichi-ken (JP)

(72) Inventor: Kenji Kimura, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 579 days.

(21) Appl. No.: 15/074,565

(22) Filed: Mar. 18, 2016

(65) Prior Publication Data
US 2016/0285142 A1    Sep. 29, 2016

(30) Foreign Application Priority Data
Mar. 23, 2015  (JP) .................. 2015-059252

(51) Int. Cl.
*H01M 10/617* (2014.01)
*H01M 10/625* (2014.01)
(Continued)

(52) U.S. Cl.
CPC ............ *H01M 10/617* (2015.04); *B60K 1/04* (2013.01); *B60L 50/64* (2019.02); *B60L 50/66* (2019.02);
(Continued)

(58) Field of Classification Search
CPC ............ H01M 10/617; H01M 10/625; H01M 10/643; H01M 10/6557; H01M 10/6561; H01M 10/6571; H01M 10/615; H01M 10/657; H01M 10/6555; H01M 10/613; H01M 2/1077; H01M 2/10;
(Continued)

(56) References Cited

U.S. PATENT DOCUMENTS 7,989,102 B2 *  8/2011  Fukusako ........... H01M 2/1016
429/120
2003/0162084 A1   8/2003  Shigeta et al.
(Continued)

FOREIGN PATENT DOCUMENTS

CN    1235311 C    1/2006
EP    1333521 A2   8/2003
(Continued)

OTHER PUBLICATIONS

Communication dated Jul. 27, 2016, from the European Patent Office in counterpart European application No. 16159859.4.
(Continued)

*Primary Examiner* — Michael L Dignan
(74) *Attorney, Agent, or Firm* — Sughrue Mion, PLLC

(57) ABSTRACT

A battery pack including adjacent battery modules is provided. Each of the battery modules includes one or more cylindrical batteries; a thermal diffusing plate holding the one or more cylindrical batteries; and a first chamber configured to distribute cooling air to cool each of the one or more cylindrical batteries. The battery pack further includes a second chamber provided between the adjacent battery modules, each of the respective thermal diffusing plates of the adjacent battery modules forming at least part of a wall of the second chamber; and a heater provided in the second chamber, the heater facing the respective thermal diffusing plates of the adjacent battery modules.

4 Claims, 6 Drawing Sheets

(51) Int. Cl.
*H01M 10/643* (2014.01)
*H01M 10/6561* (2014.01)
*H01M 10/615* (2014.01)
*H01M 10/6555* (2014.01)
*H01M 2/10* (2006.01)
*H01M 10/613* (2014.01)
*H01M 10/657* (2014.01)
*B60L 50/64* (2019.01)
*B60L 58/27* (2019.01)
*B60L 50/60* (2019.01)
*H01M 10/6557* (2014.01)
*H01M 10/6571* (2014.01)
*B60K 1/04* (2019.01)

(52) U.S. Cl.
CPC ............ *B60L 58/27* (2019.02); *H01M 2/1077* (2013.01); *H01M 10/613* (2015.04); *H01M 10/615* (2015.04); *H01M 10/625* (2015.04); *H01M 10/643* (2015.04); *H01M 10/657* (2015.04); *H01M 10/6555* (2015.04); *H01M 10/6557* (2015.04); *H01M 10/6561* (2015.04); *H01M 10/6571* (2015.04); *B60K 2001/0416* (2013.01); *B60K 2001/0422* (2013.01); *B60K 2001/0433* (2013.01); *B60L 2240/545* (2013.01); *H01M 2220/20* (2013.01); *Y02T 10/7005* (2013.01); *Y02T 10/705* (2013.01)

(58) Field of Classification Search
CPC ............ H01M 2220/20; B60L 11/1874; B60L 11/1877; B60L 11/1875; B60L 11/1879; B60L 11/18; B60L 2240/545; B60K 1/04; B60K 2001/0422; B60K 2001/0433; B60K 2001/0416; Y02T 10/7005; Y02T 10/705

USPC .......................................................... 429/120
See application file for complete search history.

(56) References Cited

U.S. PATENT DOCUMENTS

| | | |
|---|---|---|
| 2006/0068278 A1 | 3/2006 | Bloom et al. |
| 2008/0096072 A1 | 4/2008 | Fukusako et al. |
| 2008/0268328 A1 | 10/2008 | Lee et al. |
| 2012/0021260 A1 | 1/2012 | Yasui et al. |
| 2012/0242291 A1 | 9/2012 | Kimura |
| 2013/0017422 A1 | 1/2013 | Bae et al. |
| 2015/0311484 A1 | 10/2015 | Katayama et al. |
| 2016/0118701 A1* | 4/2016 | Subramanian .... H01M 10/6554 429/120 |
| 2018/0006345 A1* | 1/2018 | Murata ............... H01M 10/615 |

FOREIGN PATENT DOCUMENTS

| | | | |
|---|---|---|---|
| EP | 1705743 | A1 | 9/2006 |
| JP | 2007095483 | A | 4/2007 |
| JP | 2008-53149 | A | 3/2008 |
| JP | 2008277243 | A | 11/2008 |
| JP | 2010033799 | A | 2/2010 |
| JP | 2012-243535 | A | 12/2012 |
| JP | 5392407 | B2 | 1/2014 |
| JP | 2014060033 | A | 4/2014 |
| KR | 1020110118807 | A | 11/2011 |
| WO | 2012/124446 | A1 | 9/2012 |

OTHER PUBLICATIONS

Specification and Claims for U.S. Appl. No. 15/077,314.
Specification and Claims for U.S. Appl. No. 15/044,255.

* cited by examiner

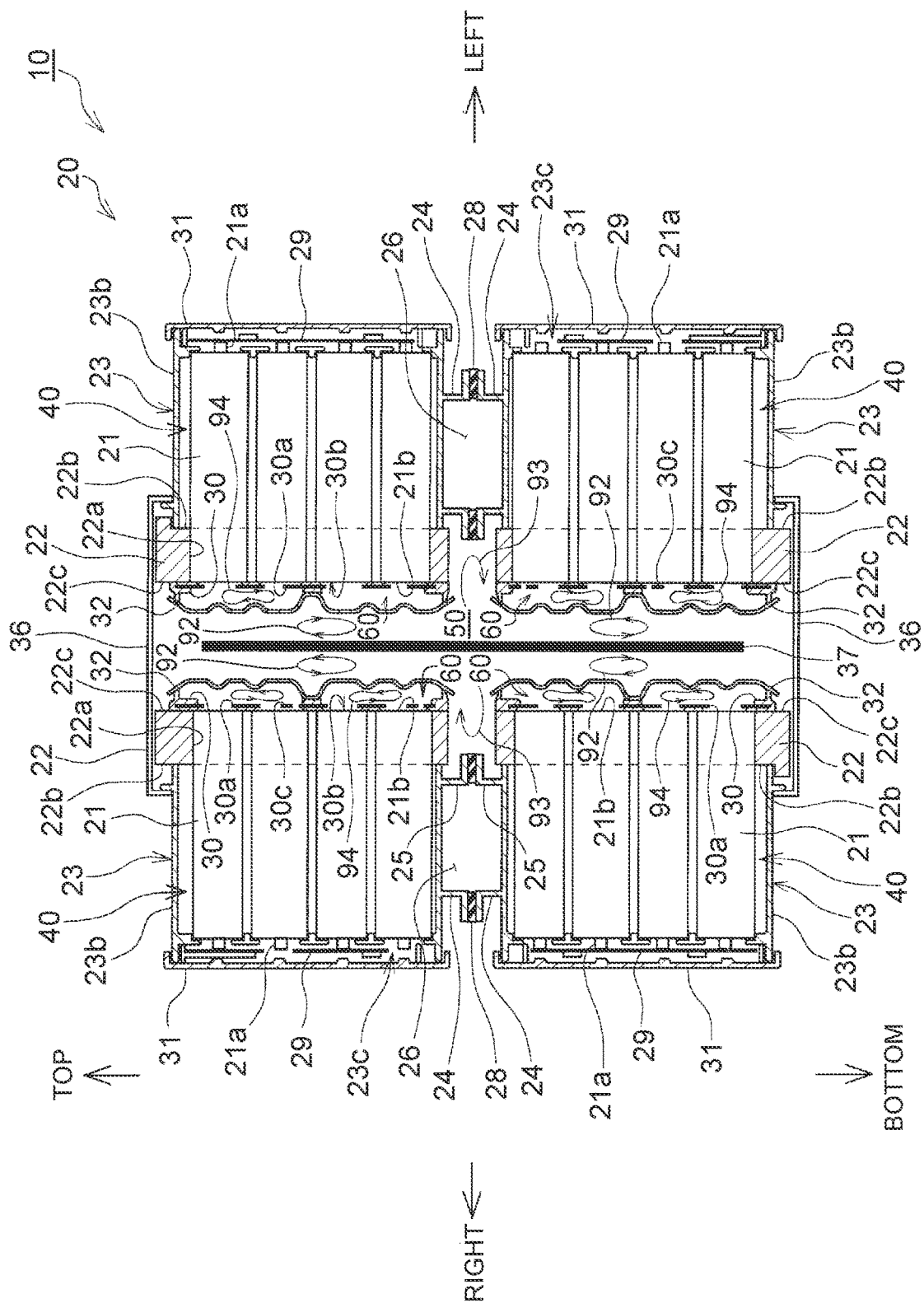

BATTERY PACK AND HEATER ASSEMBLY

REFERENCE TO RELATED APPLICATIONS

This application claims priority from Japanese Patent Application No. 2015-059252, filed on Mar. 23, 2015 in the Japanese Patent Office, the disclosure of which, including the specification, drawings and abstract, is incorporated herein by reference in its entirety.

BACKGROUND

1. Field

Apparatuses and methods consistent with the exemplary embodiments relate to a structure of a battery pack containing a plurality of battery modules each of which includes a plurality of cylindrical batteries.

2. Description of Related Art

Battery packs configured by housing battery sets including a number of batteries connected to one another in series or in parallel in casings are used in electric motor vehicles or the like. Such battery packs cause problems, such as decrease in output thereof and decrease in recharging capacity, if the temperature becomes lower. There has been a conventional proposal to provide a battery pack with a heater so as to heat each battery by this heater if the temperature is low.

For example, Japanese Patent No. 5392407 discloses a technique regarding a battery back including plural cylindrical batteries and a metallic battery holder that holds the plural cylindrical batteries wherein a heater is directly disposed to a side surface of the battery holder so as to heat the cylindrical batteries through the battery holder.

Japanese Patent Application Publication No. 2012-243535 discloses a technique regarding a battery pack including plural cylindrical batteries and a battery holder partitioned into separated battery housing spaces in each of which each of the plural cylindrical batteries can be housed wherein a heating element is disposed with a heating surface thereof in contact with part of an outer circumferential surface of each cylindrical battery so as to directly heat the part of each cylindrical battery by the heating element.

Japanese Patent Application Publication No. 2008-053149 discloses a battery pack including: a stacked battery formed by stacking plural square batteries; a casing that houses the stacked battery and has a separator providing separation from the stacked battery; and a heater disposed to an outer surface of the separator, wherein the stacking battery is configured to heat each square battery through air present between the separator and the batteries.

Recently, a longer travel distance has been required in electric vehicles. A longer electrically-driven travel distance has also been required in hybrid vehicles. More batteries are required to be installed on a vehicle in order to increase an electrically-driven travel distance, but a space in the vehicle for allowing installation of the batteries is limited. For this reason, it has been considered to mount a number of battery modules in a relatively small size in a casing adjusted to a vehicle space.

As aforementioned, if a number of battery modules are mounted in a battery pack, a number of heaters are required, which causes a problem that complicates a structure, wiring, or the like. Such a problem might be caused in both the case of heating the batteries by the heater directly fixed to the battery holder as described in the related art of JP 5392407B, and the case of attaching the heater in contact with each cylindrical battery so as to heat each cylindrical battery as described in the related art of JP 2012-243535 A. In the related art of JP 2008-053149 A, an air space projecting from the casing is provided and the heater is attached to the outside of this air space; therefore, a dimension of the battery pack becomes greater, which might make it difficult to house the battery pack in a vehicle space in some cases.

SUMMARY

In response to the above noted prior art deficiencies, a battery pack having a compact and simple configuration is provided.

According to one aspect of an exemplary embodiment, a battery pack is provided. The battery pack includes battery modules, thermal diffusing plates, a first chamber, a second chamber, and a heater. The battery modules include adjacent battery modules, and each of the battery modules includes cylindrical batteries. The thermal diffusing plates hold the cylindrical batteries. Cooling air to cool each of the cylindrical batteries is introduced into the first chamber. The second chamber is provided in outer spaces of the battery modules. At least part of a wall of the second chamber is configured by the respective thermal diffusing plates of the adjacent battery modules. The heater is disposed in the second chamber, and faces the respective thermal diffusing plates of the adjacent battery modules across a predetermined distance.

Through this configuration, it is possible to heat the plural battery modules with a single heater, thus simplifying a configuration of the battery pack, and making the battery pack compact.

According to the above aspect, the second chamber includes a convection zone. The convection zone includes a convecting substance, and the convection zone is disposed between the heater and the respective thermal diffusing plates of the adjacent battery modules.

In this manner, the heater is disposed in an empty space between the adjacent battery modules, thereby using the inner space of the battery pack as widely as possible, and also configuring the battery pack to be compact.

According to the above aspect, the second chamber includes an air space. The air space is disposed between the heater and the respective thermal diffusing plates of the adjacent battery modules. According to the above aspect, the battery modules further comprising a flow passage.

In this manner, the heater is disposed in the empty space between the adjacent battery modules, thereby using the inner space of the battery pack as widely as possible, and also configuring the battery pack to be compact.

The exemplary embodiment promotes an effect to provide a battery pack having a compact and simple configuration.

According to the above aspect, the adjacent battery modules are arranged in such a manner that corresponding surfaces of the respective thermal diffusing plates of the adjacent battery modules are located in an identical plane.

According to the above aspect, the battery pack further comprises a flow passage. The flow passage is configured to introduce the cooling air to the adjacent battery modules, the flow passage and the second chamber are disposed between the adjacent battery modules.

According to the above aspect, each of the battery modules includes a smoke exhaust passage. The smoke exhaust passage is a space partitioned from the first chamber. The smoke exhaust passage includes a bottom cover. At least part of the bottom cover is located on an opposite side of the thermal diffusing plate from the first chamber. The adjacent battery modules are arranged in such a manner that the bottom covers of each of the adjacent battery modules face each other. At least part of walls configuring the second chamber is the bottom covers.

BRIEF DESCRIPTION OF THE DRAWINGS

Features, advantages, and technical and industrial significance of exemplary embodiments of the exemplary embodiments will be described below with reference to the accompanying drawings, in which like numerals denote like elements, and wherein:

FIG. 6 is a cross sectional view of battery modules housed in a battery pack according to another exemplary embodiment.

DETAILED DESCRIPTION OF EMBODIMENTS

Figure 1:
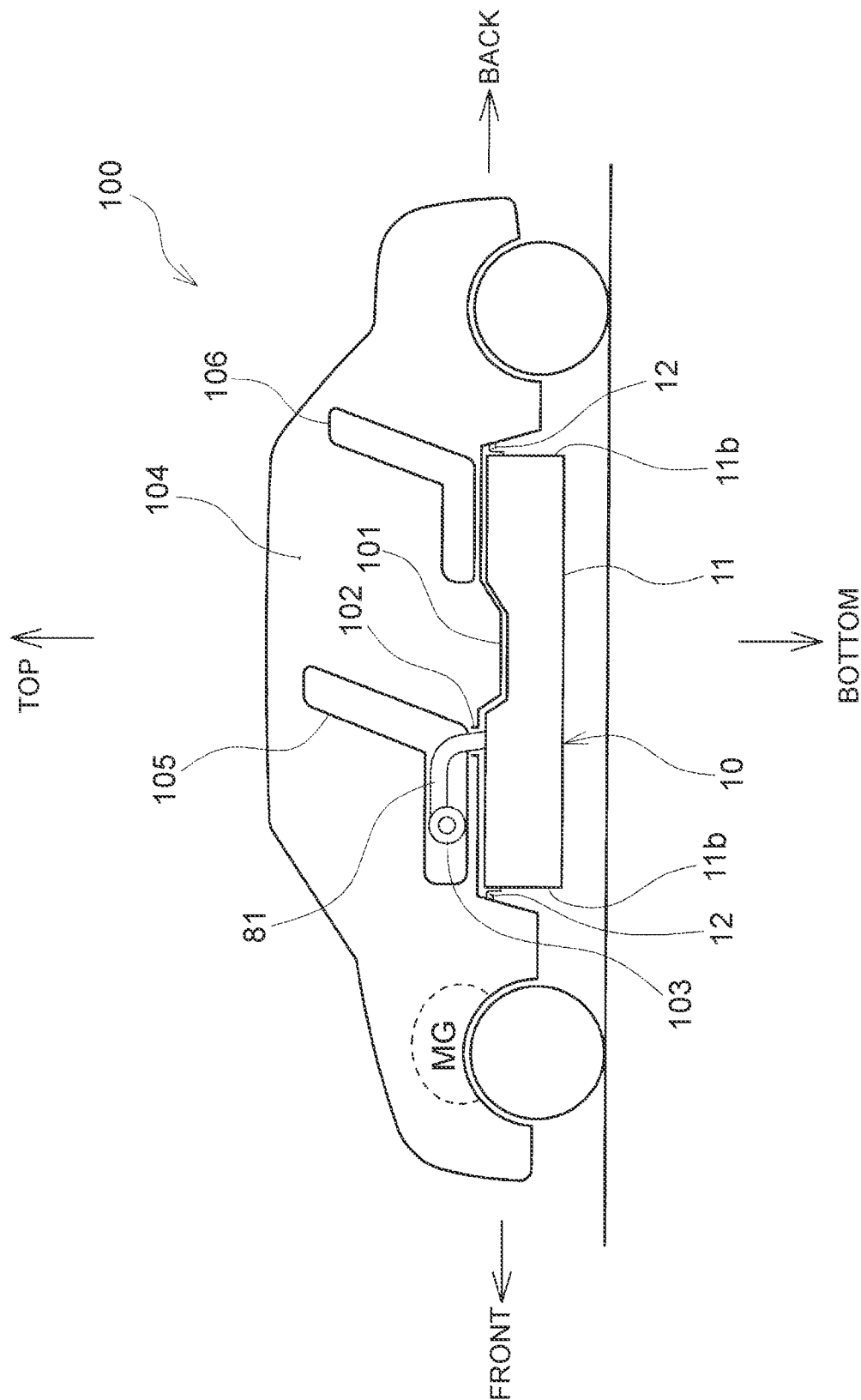
FIG. 1 is an explanatory view showing a state in which a battery pack according to an exemplary embodiment is installed in an electric motor vehicle.

Hereinafter, exemplary embodiments will be described with reference to drawings. In the following embodiment, as shown in FIG. 1, a battery pack 10 is installed to a bottom surface of a floor panel 101 under a front seat 105 and a rear seat 106 of an electric vehicle 100 driven by a motor generator. More specifically, as shown in FIG. 1, the battery pack 10 is fixed to a bottom surface of the floor panel 101 of the electric vehicle 100 with brackets 12 attached to side plates 11b of a casing 11. The battery pack 10 is hung from the floor panel 101. Cooling air for cooling batteries housed in the battery pack 10 is supplied by a cooling fan 103 disposed inside a vehicle interior 104. In FIG. 1, "TOP" denotes a perpendicularly upward direction, "BOTTOM" denotes a perpendicularly downward direction, "FRONT" denotes a frontward direction of the electric vehicle 100, and "BACK" denotes a rearward direction of the electric vehicle 100.

Figure 2:
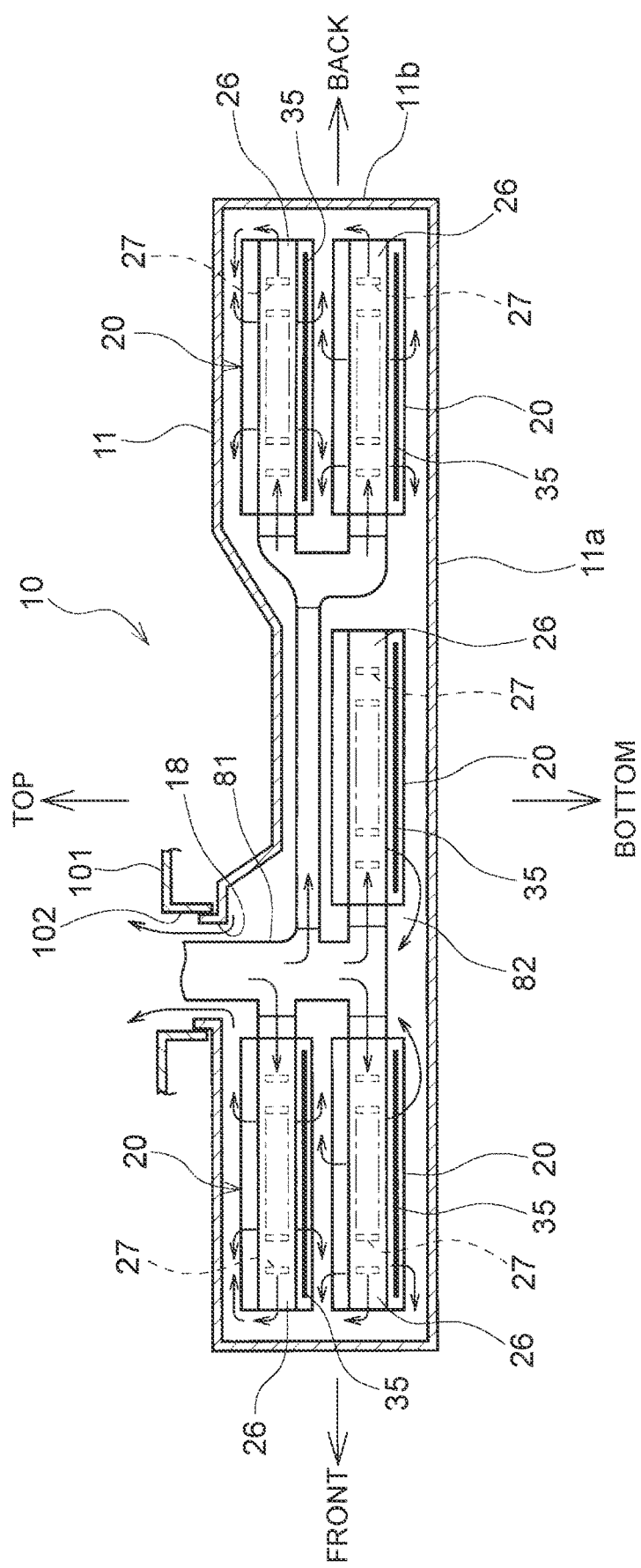
FIG. 2 is an elevation view of the battery pack according to an exemplary embodiment.
Figure 3:
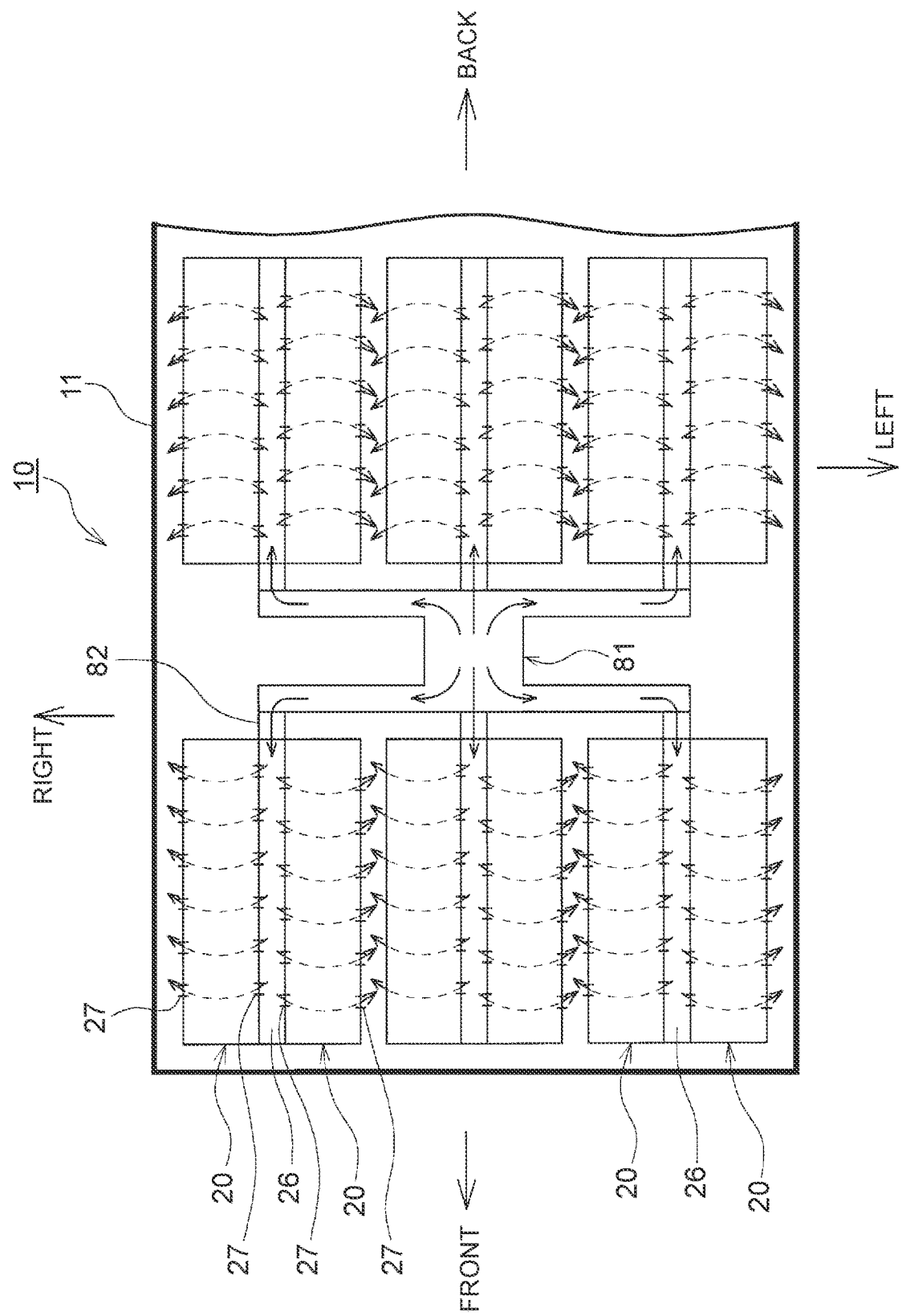
FIG. 3 is a plan view of the battery pack according to an exemplary embodiment.

As shown in FIG. 2, the battery pack 10 of the present embodiment includes battery modules 20 and bar heaters 35 housed in the casing 11. As shown in FIG. 2 and FIG. 3, air flow passages 26 through which the cooling air for cooling the batteries housed in the battery modules 20 flows are formed adjacent to respective side surfaces of the battery modules 20. A cooling air duct 81 that introduces the cooling air sent from the cooling fan 103 as shown in FIG. 1 via a connecting duct 82 into the air flow passage 26 is connected to the air flow passage 26. As shown in FIG. 2, the cooling air duct 81 is introduced from a through-portion 102 formed in a floor panel 101 through an inlet nozzle 18 disposed to an upper part of the casing 11 into the casing 11.

As shown in FIG. 2 and FIG. 3, the cooling air sent from the cooling fan 103 flows through the cooling air duct 81 and the connecting duct 82 into the air flow passages 26 formed adjacent to the side surface of each battery module 20. A terminal end of each air flow passage 26 is closed, and thus the air having flown in the air flow passage 26 flows from slits 27 provided in the side surface of each battery module 20 into an inside of the battery module 20. The cooling air then cools the batteries housed inside each battery module 20. The cooling air of which temperature becomes higher after cooling the batteries is exhausted to an outside of each battery module 20 from slit 27 formed in an opposite side surface of each battery module 20. The exhausted air flows through a space between the battery modules 20 and the casing 11, and then flows through a gap between the inlet nozzle 18 of the casing 11 as well as the through-portion 102 of the floor panel 101 and the cooling air duct 81, and is returned into the vehicle interior 104.

Figure 4:
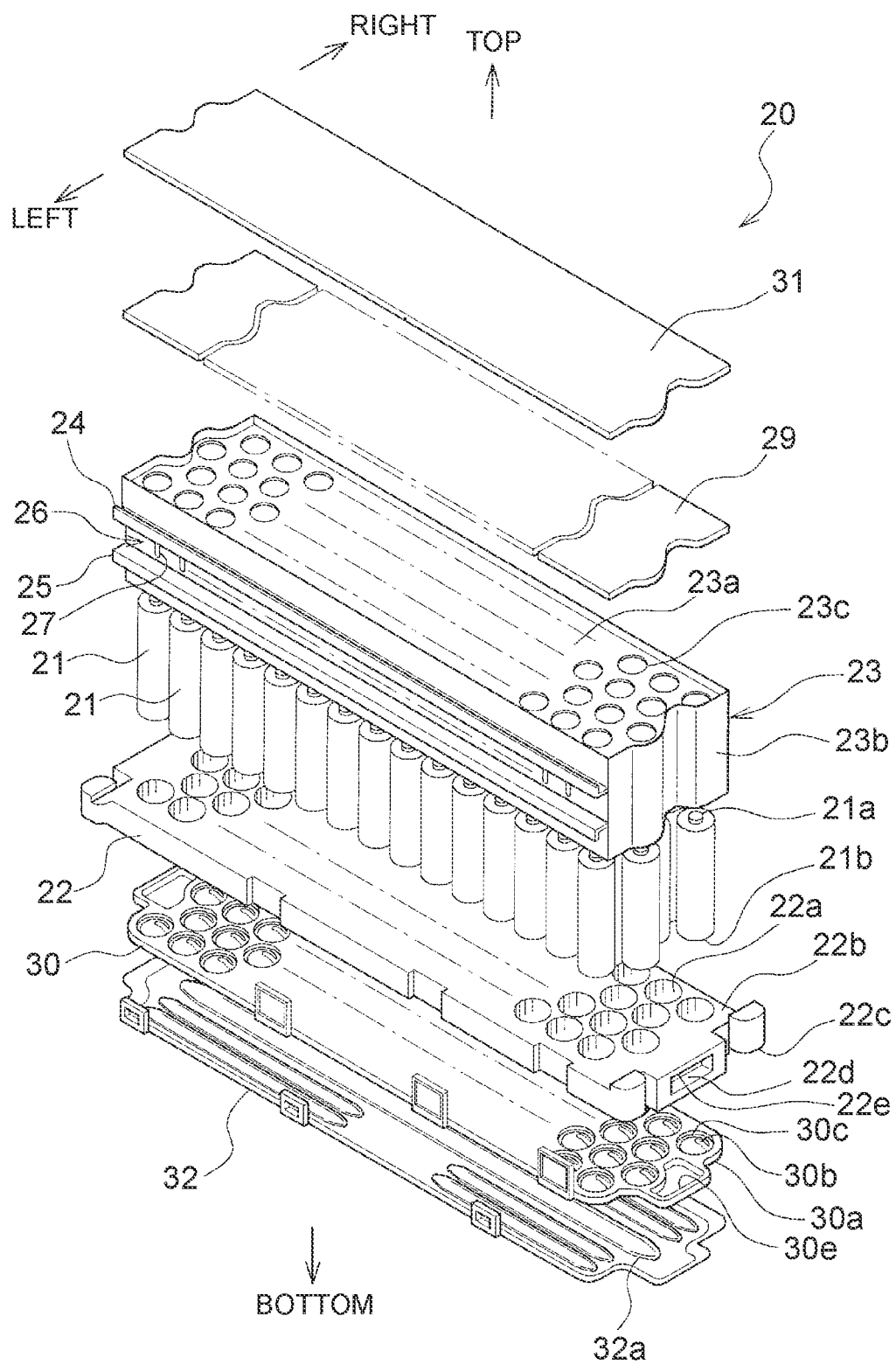
FIG. 4 is a perspective view of a battery module housed in the battery pack according to an exemplary embodiment.

As shown in FIG. 4, each battery module 20 includes plural cylindrical batteries 21, a thermal diffusing plate 22, a resin cover 23, a ceiling cover 31, and a bottom cover 32. The thermal diffusing plate 22 holds the cylindrical batteries 21, and the resin cover 23 covers an outer circumference of a cylindrical battery set held by the thermal diffusing plate 22. The ceiling cover 31 is disposed onto an upper portion of the cover 23. The bottom cover 32 is disposed to a lower portion of the thermal diffusing plate 22, and is formed in a tray shape. The cylindrical batteries 21 are chargeable and dischargeable secondary batteries, such as nickel-metal hydride batteries and lithium-ion batteries housed in a cylindrical case, for example.

The thermal diffusing plate 22 is a metallic plate, such as aluminum, provided with a number of through-holes 22a into which the cylindrical batteries 21 are inserted. The cylindrical batteries 21 are assembled to the thermal diffusing plate 22. The cylindrical batteries 21 are inserted into the through-holes 22a, and are then fixed to the through-holes 22a by filling a gap between inner surfaces (cylindrical surfaces) of the through-holes 22a and outer surfaces (cylindrical surfaces) of the cylindrical batteries 21 with an adhesive agent. The cylindrical batteries 21 are assembled into the through-holes 22a of the thermal diffusing plate 22, thereby transferring heat from the outer surfaces (cylindrical surfaces) of the cylindrical batteries 21 having a higher temperature to the thermal diffusing plate 22 by thermal conductivity so as to decrease the temperature of the cylindrical batteries 21 having a higher temperature. Furthermore, heat of the thermal diffusing plate 22 is transferred to the cylindrical batteries 21 having a lower temperature by thermal conductivity so as to increase the temperature of the cylindrical batteries 21 having a lower temperature. This means that the cylindrical batteries 21 are held by the through-holes 22a so that heat transfer can be achieved between the cylindrical surfaces thereof and the thermal diffusing plate 22. The thermal diffusing plate 22 suppresses variation in temperature among the cylindrical batteries 21. For this reason, the thermal diffusing plate 22 is formed by a metallic material, such as aluminum, having a high thermal conductivity so as to promote heat transfer among the cylindrical batteries 21. The thermal diffusing plate 22 has a thickness sufficient for holding the cylindrical batteries 21 by the cylindrical surfaces of the through-holes 22a, and achieving an effective heat transfer by thermal conductivity, specifically, approximately 10 to 20 mm, or a ¼ thickness of a length of each cylindrical battery 21, for example.

Figure 5:
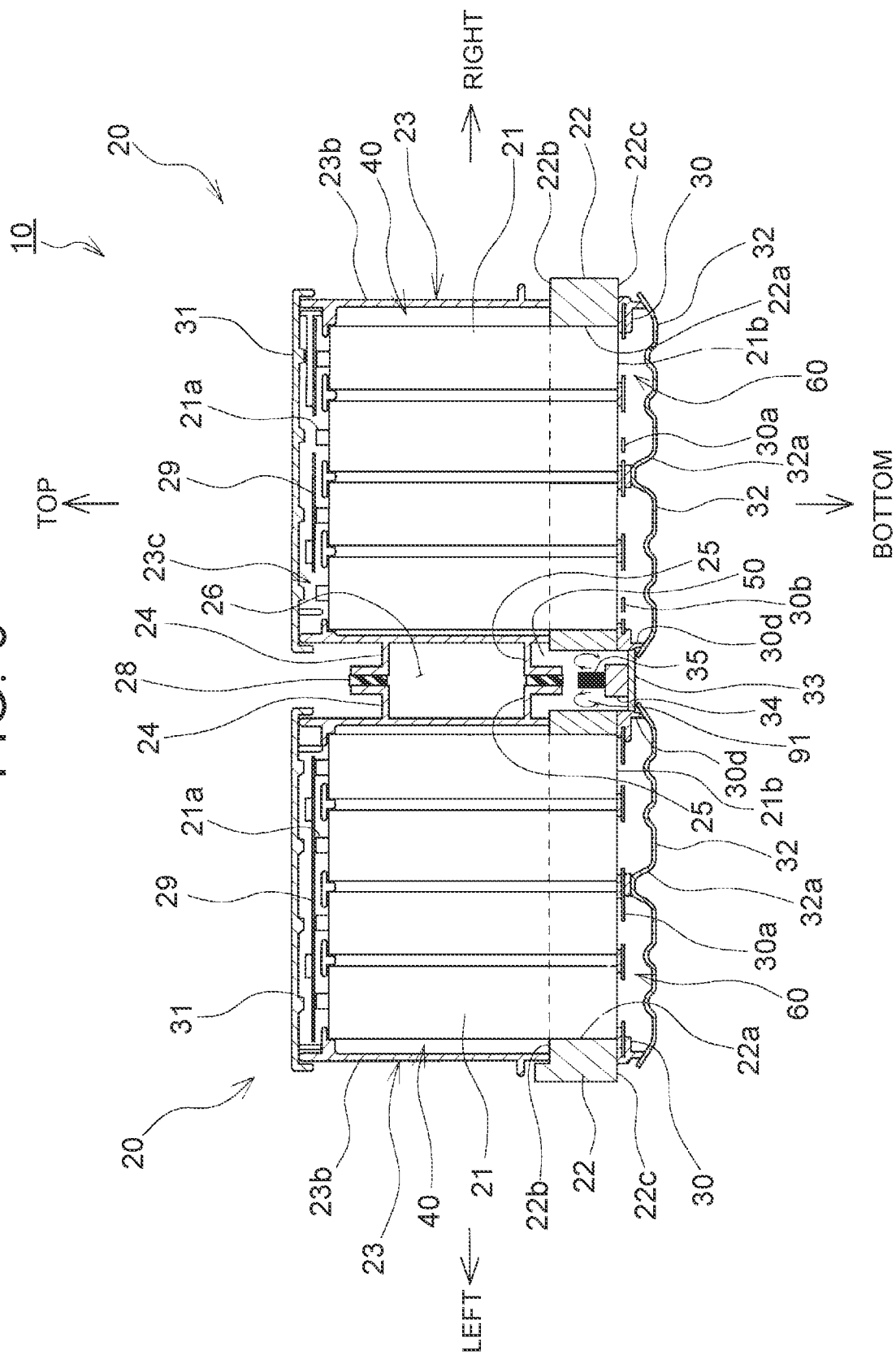
FIG. 5 is a cross sectional view of the battery modules housed in the battery pack according to an exemplary embodiment.

The resin cover 23 includes a ceiling plate 23a and a rectangular cylinder 23b. The ceiling plate 23a is a member having holes 23c from which respective positive electrodes 21a of the cylindrical batteries 21 project. The rectangular cylinder 23b is configured to cover the outer circumference of the plural cylindrical batteries 21 that are assembled to the thermal diffusing plate 22. As shown in FIG. 4, if the cover 23 is attached onto the thermal diffusing plate 22, the respective positive electrodes 21a of the cylindrical batteries 21 project from corresponding holes of the ceiling plate 23a of the cover 23. As shown in FIG. 4 and FIG. 5, plural positive-electrode bus bars 29 are disposed onto the holes 23c of the cover 23 in such a manner that each of the positive-electrode bus bars 29 connects the positive electrodes 21a of the cylindrical batteries 21 for each of several groups. The resin ceiling cover 31 is disposed onto the plural positive-electrode bus bars 29.

As shown in FIG. 4, an L-shaped upper flange 24 and an L-shaped lower flange 25 are formed on a side surface of the cover 23 in a manner as to protrude outward. A flange surface of the upper flange 24 extends upward, and a flange surface of the lower flange 25 extends downward. As shown in FIG. 5, there are two types of battery modules 20: each battery module 20 of one type having the flanges 24, 25 formed on the left side surface of the cover 23, and each battery module 20 of the other type having the flanges 24, 25 formed on the right side surface of the cover 23. These battery modules of two types are arranged in combination with each other side by side in a vehicle left-right direction. As shown in FIG. 5, the battery modules of two types are configured in such a manner that the flange surfaces of the flanges 24 of the respective battery modules face each other, and the flange surfaces of the flanges 25 of the respective battery modules face each other. As aforementioned, the battery modules of two types are combined with a seal member 28, such as a rubber plate, held between the corresponding flange surfaces that face each other. The flange surfaces of the corresponding flanges 24 and the flange surfaces of the corresponding flanges 25 of the respective battery modules 20 are positioned in such a manner that upper surfaces 22b of the corresponding thermal diffusing plates 22 of the respective battery modules 20 are positioned in the identical plane, and lower surfaces 22c of the corresponding thermal diffusing plates 22 of the respective battery modules 20 are positioned in the identical plane. If the battery modules are combined in the above manner, the air flow passage 26 is formed between the adjacent battery modules 20. As shown in FIG. 4, slits 27 that introduce the cooling air for the cylindrical batteries are formed in a longitudinal side surface of the cover 23 that forms the air flow passage 26. FIG. 4 illustrates the slits 27 formed in the left side surface of the cover 23, but the same slits 27 are formed in the right side surface thereof where no flanges 24, 25 of the cover 23 are formed. The slits 27 formed in the right side surface of the cover 23 face the air flow passage 26. The slits 27 are configured to exhaust the air after having flown into the cover 23 and having cooled the cylindrical batteries 21 from the cover 23.

The upper surface 22b of the thermal diffusing plate 22, the cover 23, and the ceiling cover 31 define a space where the cylindrical batteries 21 are housed, and also forms a first chamber 40 that is a space into which the cooling air for cooling the cylindrical batteries 21 is introduced.

As shown in FIG. 4 and FIG. 5, a negative-electrode bus bar assembly 30 that connects the negative electrodes 21b of the cylindrical batteries 21 for each of several groups is disposed on the bottom side of the lower surface 22c of the thermal diffusing plate 22. As shown in FIG. 5, the negative-electrode bus bar assembly 30 is configured by arranging and resin-molding plural negative-electrode bus bars 30a each of which is formed by forming holes 30c corresponding to the arrangement of the cylindrical batteries 21 in a plate having the same shape as that of the positive-electrode bus bar 29. A plate terminal 30b in contact with the negative electrode 21b of each cylindrical battery 21 is formed in the hole 30c of each negative-electrode bus bar 30a.

Each positive-electrode bus bar 29 connects the positive electrodes 21a of the cylindrical batteries 21 in the same group, and each negative-electrode bus bar 30a connects the negative electrodes 21b of the cylindrical batteries 21 in the same group, and the cylindrical batteries 21 in each same group that are connected by each positive-electrode bus bar 29 and the cylindrical batteries 21 in each same group that are connected by each negative-electrode bus bar 30a are connected, respectively in parallel. The positive-electrode bus bars 29 and the negative-electrode bus bars 30a are connected by a connecting bus bar (not shown) so as to configure the battery set in which the plural groups each of which includes the plural cylindrical batteries 21 connected in parallel are connected in series.

As shown in FIG. 4 and FIG. 5, the bottom cover 32 of which center portion is recessed in a tray-shape, and of which bottom surface has reinforcing recessed-protruding portions 32a is disposed to a bottom side of the negative-electrode bus bar assembly 30. As shown in FIG. 5, a resin rib 30d protrudes from an outer circumference of the bottom surface of the negative-electrode bus bar assembly 30, and the resin rib 30d is disposed such that an outer circumference of the bottom cover 32 comes into contact with a front end of the rib 30d. The bottom cover 32 is formed by metal having a high heat transfer property, such as aluminum.

As shown in FIG. 4, an opening 30e in a substantially rectangular shape is provided at each longitudinal end of the negative-electrode bus bar assembly 30. An opening 22e is provided at each longitudinal end of the lower surface 22c of the thermal diffusing plate 22. An opening 22d is provided in each longitudinal end surface of the thermal diffusing plate 22. The opening 22d in each end surface and the opening 22e of the lower surface 22c of the thermal diffusing plate 22 are configured to be communicated with each other through a flow passage bent in an L-shape. If the negative-electrode bus bar assembly 30 is attached to the lower surface 22c of the thermal diffusing plate 22, the opening 30e of the negative-electrode bus bar assembly 30 is overlaid with the opening 22e of the lower surface of the thermal diffusing plate 22. Accordingly, the negative-electrode bus bar assembly 30 and the bottom cover 32 are attached to the thermal diffusing plate 22, thereby forming a flow passage that communicates a space between the thermal diffusing plate 22 and the bottom cover 32 with the opening 22d in each end surface of the thermal diffusing plate 22.

Each of the negative electrodes 21b of the cylindrical batteries 21 has a structure to open an end surface thereof by inner pressure if gas is generated inside the cylindrical battery 21 so as to exhaust the gas to the outside. Hence, the gas exhausted from the negative electrodes 21b of the cylindrical batteries 21 flows into the space formed under the thermal diffusing plate 22. The gas having flown into this space flows through between the thermal diffusing plate 22 and the bottom cover 32 to the both ends of the battery module 20, and is exhausted through the opening 30e of the negative-electrode bus bar assembly 30, each opening 22e and each opening 22d of the thermal diffusing plate 22 to the outside. Accordingly, the space between the thermal diffusing plate 22 and the bottom cover 32 configures a smoke exhaust passage 60 to exhaust the gas if the gas is discharged from the cylindrical batteries 21.

As shown in FIG. 5, below the flow passage 26 formed by combining the two battery modules 20 to each other, there is formed a space between the right end surface of one of the combined thermal diffusing plates 22 and the left end surface of the other of the combined thermal diffusing plates 22. There is provided a flat plate 33 between the corresponding ribs 30d of the respective negative-electrode bus bar assemblies 30 of the two adjacent battery modules 20 below this space. Not-shown flat plates are also disposed to both end surfaces in the vehicle front-back direction of the adjacent battery modules 20 in this space. The circumference of the space below the air flow passage 26 is surrounded in four directions by the side surfaces of the respective covers 23, the respective flanges 25, the right side surface and the left side surface of the respective thermal diffusing plates 22, the flat plates 33, and the flat plates attached to the both end surfaces in the vehicle front-rear direction of the adjacent battery modules 20; therefore, this space becomes a second chamber 50 as a closed space. As shown in FIG. 5, a heater support member 34 that supports the bar heater 35 is disposed on the flat plate 33. The bar heater 35 is attached onto the heater support member 34. There is formed an air space between the left side surface and the right side surface of the respective thermal diffusing plates 22 of the adjacent battery modules 20. In this manner, the second chamber 50 corresponds to respective outer spaces of the battery modules 20. The left side surface and the right side surface of the respective thermal diffusing plates 22 of the adjacent battery modules 20 serve as part of a wall that partitions the closed space.

As shown in FIG. 5, heat emitted from the bar heater 35 heats the air in the second chamber 50, and circulates the air in the second chamber 50 by convection. The air in the second chamber 50 moves as indicated by arrows 91 of FIG. 5 by convection. The heated air comes into contact with the side surfaces of the respective thermal diffusing plates 22 of the adjacent battery modules 20 so as to heat these surfaces. Each thermal diffusing plate 22 is made of metal having a high thermal conductivity, such as aluminum. Heat input into the left end surface and the right end surface of the corresponding thermal diffusing plates 22 transfers from the surface of each through-hole 22a of each thermal diffusing plate 22 to the cylindrical surface of each cylindrical battery 21 so as to heat the cylindrical surface of each cylindrical battery 21. At this time, the thermal diffusing plate 22 can efficiently promote heat transfer among the cylindrical batteries 21, thus efficiently heating each cylindrical battery 21. Because there is an air space between the bar heater 35 and the thermal diffusing plates 22, the side surface of each thermal diffusing plate 22 can be uniformly heated in the longitudinal direction by the bar heater 35. Accordingly, it is possible to heat each cylindrical battery 21 while preventing increase in temperature difference among the cylindrical batteries 21 of each battery module 20.

As aforementioned, the battery pack 10 of the present embodiment is configured in a manner as to form the closed space between the respective thermal diffusing plates 22 below the air flow passage 26. The bar heater 35 is disposed in this closed space, and each of the cylindrical batteries 21 of each battery module 20 is heated by this bar heater 35. Hence, each of the cylindrical batteries 21 of the two battery modules 20 can be heated by the single bar heater 35. Accordingly, it is possible to heat each of the cylindrical batteries 21 of the plural battery modules 20 housed in the battery pack 10 by a fewer number of heaters. The empty space between the two adjacent battery modules 20 is so closed as to form the closed space. The bar heater 35 is disposed in this closed space. Accordingly, it is unnecessary to provide a dedicated space for the bar heater 35, and thus the inner space of the battery pack 10 can be used as widely as possible. It is also possible to configure the battery pack 10 to be compact. Furthermore, it is possible to mount more batteries or more battery modules 20 in the battery pack 10 having the same capacity.

With reference to FIG. 6, another exemplary embodiment will be explained. The same reference numerals are used for components that are the same as those of the embodiment explained with reference to FIG. 1 to FIG. 5, and description thereof will be omitted.

In the embodiment as shown in FIG. 6, four battery modules 20 are integrally combined. More specifically, one set of battery modules 20 configured by laterally combining the two battery modules 20 of FIG. 4 in a manner as to form the air flow passage 26 therebetween as shown in FIG. 5 is combined with another set of battery modules 20 having the same configuration. These two sets of battery modules 20 are combined with each other while the respective bottom covers 32 thereof face each other. Each bottom cover 32 defines the smoke exhaust passage 60 of each battery module 20. In this manner, the four battery modules 20 are integrally combined. As shown in FIG. 6, resin plates 36 are disposed to side surfaces with no flow passage 26 of the respective battery modules 20. The same plate as the plate 36 shown in FIG. 6 is also disposed to the respective end surfaces in the vehicle front-rear direction of each battery module 20. Accordingly, an outer circumference of the battery module sets configured by the four battery modules 20 in the vicinity of the thermal diffusing plates 22 is surrounded by the plates 36 in four directions, thereby forming the second chamber 50 as a closed space. As shown in FIG. 6, the second chamber is a closed space surrounded by the plates 36, the bottom covers 32, the thermal diffusing plates 22, the covers 23, and the flange 25. A seat heater 37 is disposed between the facing bottom covers 32 in the second chamber 50, and air spaces are respectively formed between the seat heater 37 and the respective bottom covers 32.

As shown in FIG. 6, heat emitted from the seat heater 37 heats the air in the second chamber 50, and circulates the air in the second chamber by convection. The air in the second chamber 50 moves due to the convection as indicated by arrows 92 of FIG. 6. The heated air comes into contact with the outer surfaces of the bottom covers 32 of the respective battery modules 20, and heats the respective surfaces thereof. Each bottom cover 32 is made of a metallic material or the like excellent in heat transfer property. The air in the smoke exhaust passages 60 is circulated by convection as indicated by arrows 94 of FIG. 6 by the respective bottom covers 32. This air convection heats the lower surfaces 22c of the respective thermal diffusing plates 22 and the negative electrodes 21b of the respective cylindrical batteries 21, thereby heating the cylindrical batteries 21 from the respective negative electrodes 21b. The air in the respective spaces between the side surfaces of the respective thermal diffusing plates 22 and the corresponding air flow passages 26 is also circulated by convection as indicated by arrows 93 of FIG. 6 so as to heat the side surfaces of the respective thermal diffusing plates 22. As similar to the aforementioned embodiment, since each thermal diffusing plate 22 is made of metal having a high thermal conductivity, such as aluminum, heat input into the left and right end surfaces of the respective thermal diffusing plates 22 is transferred from the surfaces of the through-holes 22a of each thermal diffusing plate 22 to the cylindrical surfaces of the respective cylindrical batteries 21 so as to heat the cylindrical surfaces of the cylindrical batteries 21. In the above manner, the air spaces are formed respectively between the seat heater 37 and the thermal diffusing plates 22, and between the seat heater 37 and the bottom covers 32. Since the side surface of each thermal diffusing plate 22 and each bottom cover 32 are heated through the air space by the seat heater 37, it is possible to heat each of the cylindrical batteries 21 while preventing increase in temperature difference among the cylindrical batteries 21 of each battery module 20.

In the battery pack 10 of the embodiment as shown in FIG. 6, the four battery modules 20 are arranged in such a manner that the respective bottom covers 32 of the battery modules 20 face each other with the seat heater 37 disposed between the respective bottom covers 32. Through this configuration, it is possible to heat each of the cylindrical batteries 21 of the four battery modules 20 by the single seat heater 37. Specifically, it is possible to heat each of the cylindrical batteries 21 of the plural battery modules 20 that are housed in the battery pack 10 by a fewer number of heaters. As similar to the aforementioned embodiment, the empty space by the adjacent battery modules 20 is closed into a closed space. The seat heater 37 is disposed in this closed space. Through this configuration, it is possible to use the inner space of the battery pack 10 as widely as possible, thus making the battery pack 10 compact. Furthermore, it is possible to mount more batteries or more battery modules 20 in the battery pack 10 having the same capacity.

In each of the aforementioned embodiments, it has been explained that the battery pack 10 is installed under the floor of the electric vehicle 100. However, the battery pack 10 may also be installed in a space behind the rear seat 106 as shown in FIG. 1, or in a luggage space, for example. The exemplary embodiments may also be applicable to other electric-motor vehicles that are driven by engines and motors, such as hybrid vehicles.

The present invention is not limited to the aforementioned exemplary embodiments, and includes all changes and modifications without departing from the technical scope and spirit of the invention specified by the claims.

What is claimed is:

1. A battery pack comprising:
adjacent battery modules, each battery module of the adjacent battery modules comprising:
one or more cylindrical batteries;
a thermal diffusing plate holding the one or more cylindrical batteries in each battery module; and
a first chamber configured to distribute cooling air to cool each of the one or more cylindrical batteries in each battery module;
a second chamber provided between the adjacent battery modules, the thermal diffusing plate of each of the adjacent battery modules forming at least part of a wall of the second chamber;
a heater provided in the second chamber, the heater facing the thermal diffusing plate of each of the adjacent battery modules without contacting the thermal diffusing plate of each of the adjacent battery modules that form at least part of the wall of second chamber, so that an air space is disposed between the heater and the thermal diffusing plate of each of the adjacent battery modules; and
a flow passage provided between the adjacent battery modules, wherein the flow passage is configured to introduce the cooling air into the first chamber of each of the adjacent battery modules.

2. The battery pack according to claim 1, wherein the second chamber comprises a convection zone between the heater and the thermal diffusing plate of each of the adjacent battery modules, the convection zone comprising a convecting substance.

3. The battery pack according to claim 1, wherein the adjacent battery modules are arranged in such a manner that corresponding surfaces of the thermal diffusing plate of each of the adjacent battery modules are coplanar.

4. The battery pack according to claim 1, wherein:
each battery module of the adjacent battery modules further comprises:
a bottom cover, at least a part of which is located on a side of the thermal diffusing plate opposite the first chamber; and
a smoke exhaust passage between the thermal diffusing plate and the bottom cover, the smoke exhaust passage being partitioned from the first chamber, and
the adjacent battery modules are arranged in such a manner that each of the respective bottom covers face each other so as to form at least part of the wall of the second chamber.

* * * * *